United States Patent [19]

Weatherford

[11] 3,860,519

[45] Jan. 14, 1975

[54] OIL SLICK SKIMMER

[76] Inventor: Danny J. Weatherford, 7250 N. 41st Ave., Phoenix, Ariz. 85021

[22] Filed: Jan. 5, 1973

[21] Appl. No.: 321,281

[52] U.S. Cl. .................. 210/242, 210/DIG. 21
[51] Int. Cl. ............................. E02b 15/04
[58] Field of Search ...... 210/83, 242, DIG. 21, 540

[56] References Cited
UNITED STATES PATENTS

| | | | |
|---|---|---|---|
| 3,578,171 | 5/1971 | Usher | 210/DIG. 21 |
| 3,630,376 | 12/1971 | Price | 210/242 |
| 3,646,901 | 3/1972 | Budris et al. | 210/242 X |
| 3,661,264 | 5/1972 | Peterson et al. | 210/DIG. 21 |
| 3,708,070 | 1/1973 | Bell | 210/242 |
| 3,715,034 | 2/1973 | Ivanoff | 210/242 |
| 3,737,040 | 6/1973 | Bryday et al. | 210/DIG. 21 |
| 3,752,317 | 8/1973 | Lithen | 210/DIG. 21 |
| 3,752,762 | 8/1973 | Cincotta | 210/DIG. 21 |

*Primary Examiner*—Theodore A. Granger
*Attorney, Agent, or Firm*—Warren F. B. Lindsley

[57] ABSTRACT

A boat or barge with hull appendage for skimming oil slicks or other pollutants from bodies of water and related equipment for facilitating the oil-water separating function.

3 Claims, 7 Drawing Figures

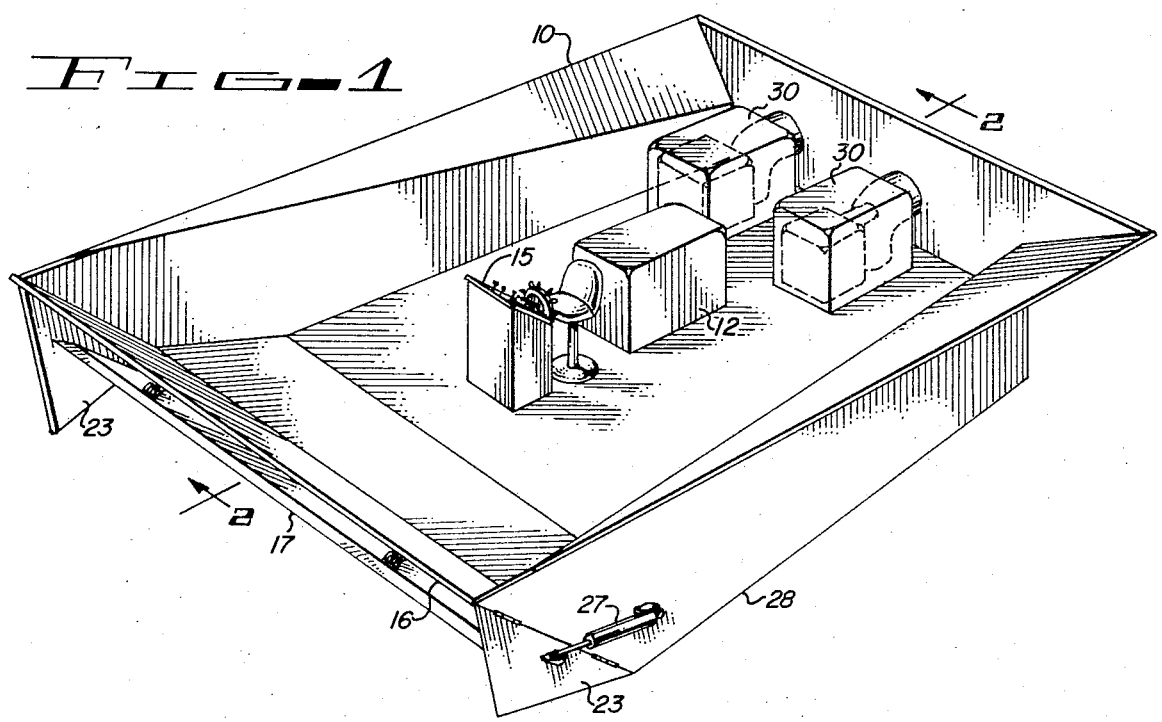
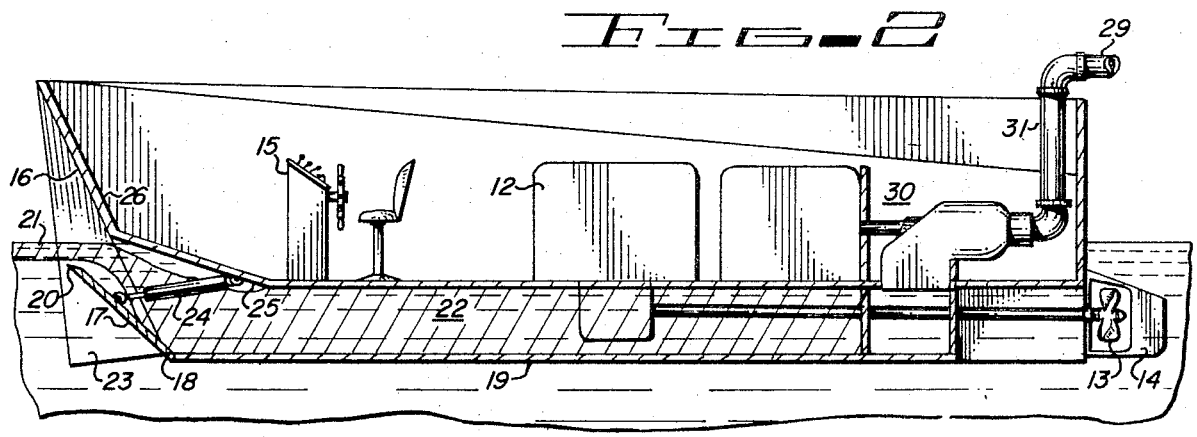
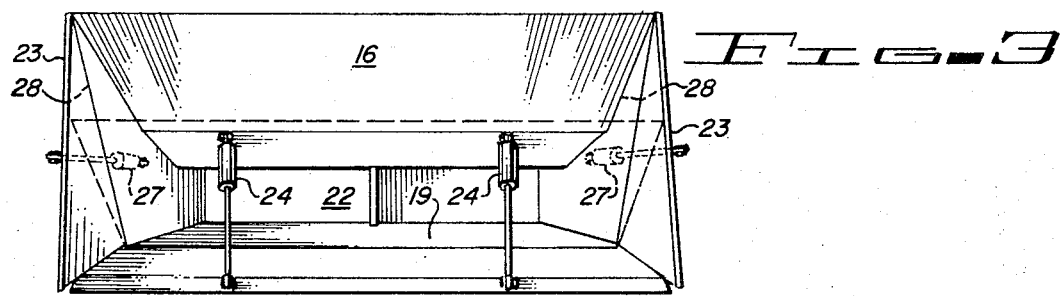

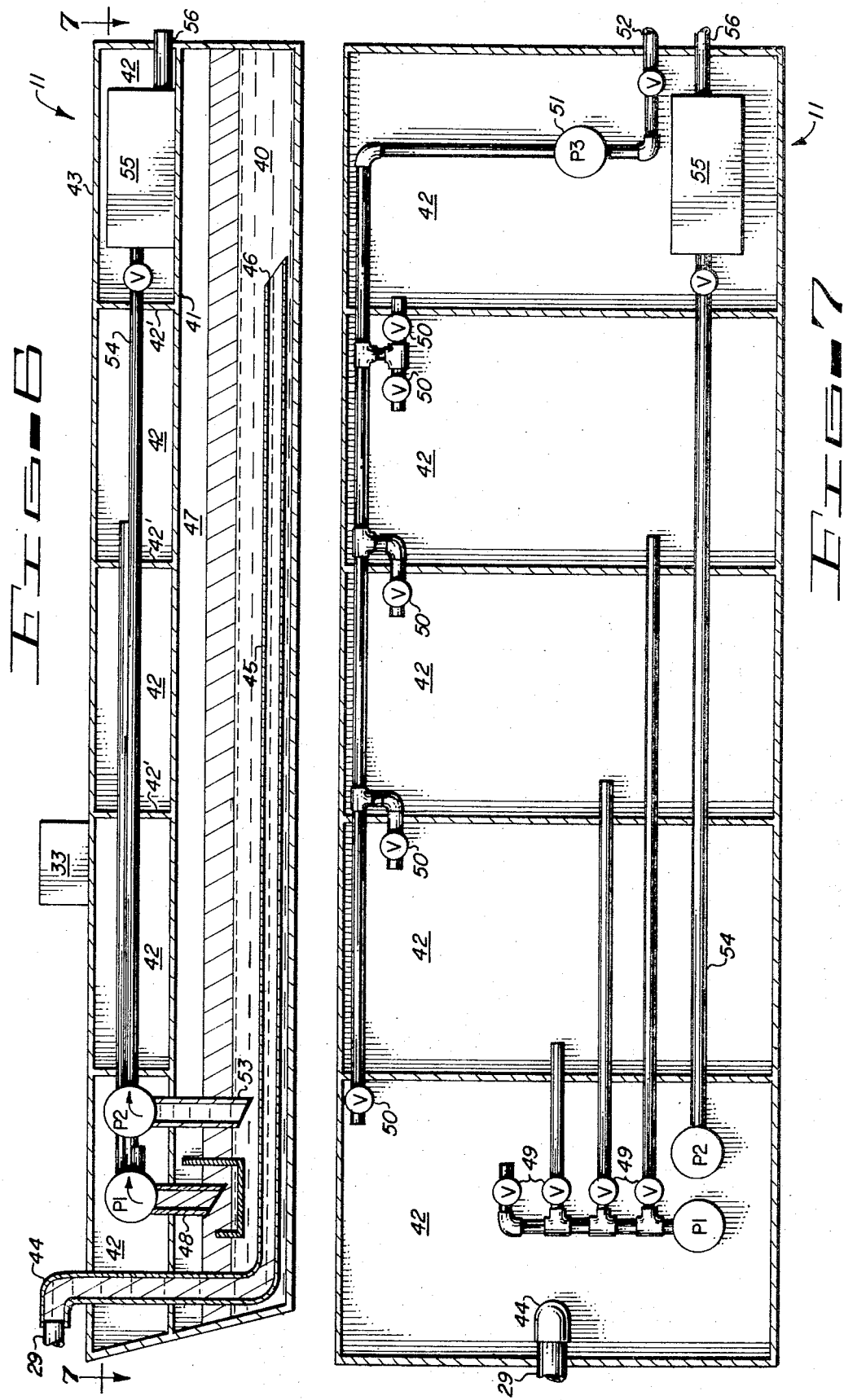

OIL SLICK SKIMMER

BACKGROUND OF THE INVENTION

The invention relates to the removal of oil slick or other pollutants from water surfaces, particularly those spills caused by accidents while handling, transporting, processing or controlling massive quantities of oil.

For many years, oil spillages at sea have been a problem recognized by the International Maritime Committee and other concerned bodies to the extent that in 1970 two conventions were held directed to the subject of liability and legal responsibility for such spills. The damage and clean-up costs of large spills can reach millions of dollars, which along with the damaging publicity present a very serious problem for the industries involved.

Major spillages, such as that which occurred when the tanker Torrey Canyon went aground in the English Channel in 1967, leaking 117,000 tons of crude oil into the sea, and the Santa Barbara 1969 offshore oil platform spillage of about 100,000 tons over a three month period, are occurring at a seemingly increasing rate. As more and more oil is transported by larger and larger tankers, and with more offshore drilling finds, the problem is apt to become more pronounced.

Since oil spills are likely to continue, with their resulting effect on marine life and biology at sea and on shore, a method and apparatus is needed for removing the oil slick as rapidly as possible from the water to control its spreading.

In the past, oil spills usually occurred in small quantities at sea or in a harbor and complaints, if any, were local; but today the awareness of pollution hazards bolstered by the massive spills of modern offshore derricks and giant tankers has become highly vocal. In addition to being a fire hazard, oil slicks blown or driven by waves to shore ruin beaches and destroy biological life for years to come.

Oil slicks floating at sea vary considerably in thickness depending on the quality of crude oil spilled, the wind, size of oil patch and condition of the sea. While the oil slick thickness is usually measured in thousandths of an inch, it can build up to as much as 0.2 inch or more. Thin films, however, are most general.

Accordingly, oil spills must be removed from the water as quickly as possible to prevent damage at sea and on the shore. However, to date, no efficient or effective method and apparatus have been conceived to handle large oil spills while at the same time protecting the natural state of the sea and land from long-term pollution and harm.

FIELD OF THE INVENTION

Detergents and other chemical treatments of the oil slicks have been used, but each has its own limitations and hazards which can be as undesirable as the oil slick itself. Since oil spillage can occur any place on water where oil is being transported, it is necessary to provide apparatus for implementing the new clean-up method which is portable.

This invention is particularly directed to a safe, effective, and expeditious method and apparatus for the removal of oil slicks at sea, in a lake or on a river with portable apparatus easily movable to the scene of the spill.

DESCRIPTION OF THE PRIOR ART

In the disaster, where the tanker Torrey Canyon ran aground and leaked 117,000 tons of crude oil into the English Channel, a panic to clean up the spill ensued as miles of beaches and valuable scenery were polluted and blighted, not to mention the biological damage to sea life. The British utilized non-ionic detergents, trying with some success to emulsify the oil, breaking it up into small particles which with evaporation greatly reduced the masses of oil reaching shore. Even so, over 60 miles of English shoreline was contaminated.

The Torrey Canyon spill also drifted in large patches across the English Channel to the French shore. At sea, the French used powdered chalk spread on the slick and churned it up with small but powerful boats. This caused the oil to break up and sink into the sea. They also tried this same technique along with sawdust with some success. Both methods still did not remove all of the oil from the water and a large amount of it still floated ashore. One French ship tried to "pile up the slick" against the side of the ship and then tried to, in effect, vacuum it with a hose and a broad nozzle. This worked, but the amount that could be gathered was relatively small.

Straw, hay and sawdust have been spread on the waters along the shore to soak up the oily mess caused by the oil slick. While this effort produced some results, the scars cannot be removed entirely for years to come. Detergents and other cleaners were used on the rocks and other shore items, but these too left their mark.

These occurences pushed the limits of the art under extremely extenuating circumstances. The efforts were very costly, abrasive socially and politically, and harmful to the natural state that existed previously. The dollar cost was staggering.

The need for better ways to remove oil slick at sea is vital and should be solved quickly and as near to the oil spill source as possible.

SUMMARY OF THE INVENTION

In accordance with the invention claimed, a new and improved, easily maneuverable boat or barge is provided which employs an appended hull which gathers and skims from the surface of the water, oil slicks along with a minimal amount of surface water into a compartment in the craft isolated from its main deck. This oil-water mixture is then pumped through a flexible hose to a storage compartment in a barge where the oil rises to the top of the water in seconds. This surface oil is then bled off the top and pumped into oil accumulation compartments. Each of these compartments, when filled, is pumped into a tanker or the equivalent for continuous removal and reclaiming. The water in the barge is also pumped through a water filter before returning to the sea. In this disclosure, the boat functions effectively when floating in an oil slick by the effects of gravity drawing the oil slick into its hull as well as when it is moving and the oil slick is forced by the forward movement of the water into the boat.

It is, therefore, an object of this invention to provide a new method of continuously gathering and removing oil slick and minimal top water from a location of an oil spill at sea or elsewhere.

Another object of this invention is to provide an improved apparatus for skimming a controlled amount of surface water covered by an oil slick.

A further object of this invention is to provide an apparatus for skimming oil slicks from the water which is adjustable to control the amount of water handled by the apparatus.

A still further object of this invention is to provide an apparatus for continuously separating oil from the top water wherein controlled amounts of oil and water are isolated one from the other with the oil reclaimed and the water filtered and retturned to the sea.

A still further object of this invention is to provide a self-contained, self-powered boat that may be portable for rapid highway transport directly to the scene of an oil spill which scoops up the oil slick and then transports it to equipment for separating the oil from the water.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWINGS

The present invention may be more readily described by reference to the accompanying drawings, in which:

FIG. 1 is a perspective view of an oil skimmer boat or barge embodying the invention;

FIG. 2 is a cross-sectional view of the skimmer boat shown in FIG. 1 taken along the line 2—2 and illustrating the double bottom arrangement;

FIG. 3 is a front end view of FIG. 1 showing the movable hinged front panel and side slick-gathering flaps with their hydraulic controls;

FIG. 6 is a cross-sectional view taken longitudinally of a towed boat or barge showing the compartment arrangement for storing and separating the skimmed oil and water; and FIG. 7 is a top view of the towed boat shown in FIG. 6.

DESCRIPTION OF THE PREFERRED EMBODIMENT

Figure 5:
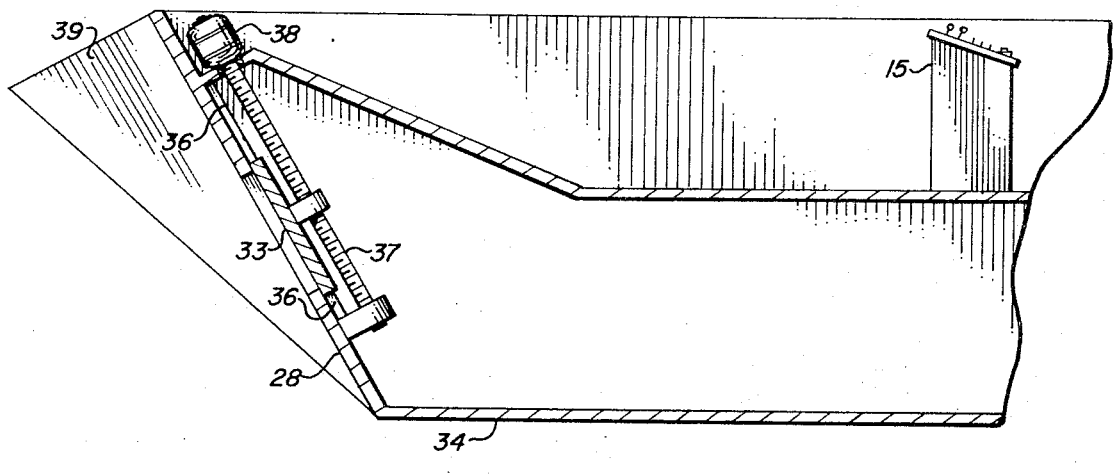
FIG. 5 is a cross-sectional view of the alternate configuration shown in FIG. 4.

Referring more particularly to the drawings by characters of reference, FIGS. 1, 2 and 5 disclose a self-propelled barge or boat 10 having a flexible hose connection to a boat or barge 11 towed or self propelled, disclosed in FIGS. 6 and 7.

Boat 10 is driven by a suitable engine 12 which is connected to rotate propeller 13 in the usual fashion for moving the boat. Steering of the boat is through a rudder 14 mounted at the stern of the boat and controlled from the operator's console 15, where all other control and measurement devices mentioned later are positioned for easy reading.

The appended hull 16 has a separate front panel 17 mounted by a water sealed hinge arrangement 18 at the bottom 19 of the boat. The panel can be rotated around hinge arrangement 18 to a plurality of positions from a closed position where hull 16 is closed from water entering therein to one of a plurality of open positions which bring the top edge 20 of panel 17 below the water level 21, thereby allowing a controlled amount of surface water and the top floating oil slick to enter the boat's isolated lower compartment 22.

Two flaps 23 are hingedly attached to the hull so as to form a funnel or scoop with panel 17 at the bow of the boat to maintain a seal between themselves and the front panel, as shown in FIGS. 1–3. These side panels extend considerably beyond the front panel 17, thereby serving both as a funneling device to gather in surface slick and as stabilizers for the boat. The front panel is controlled by one or more hydraulic devices 24 mounted between the bottom 25 of the hull 26 and the movable panel 17. Similarly, the flaps 23 are also held against the edges of the front panel by hydraulic devices 27 mounted between the flaps and the outside surfaces 28 of appended hull 16. The operator at his console 15 can remotely control the hydraulically actuated front panel, reading its position below the sea level on a console gauge by sensing the position of the rim of the hydraulic device 24 and also can measure and read the rate of water flow pumped out of a pipe or hose 29 at the stern of the boat.

As the front panel 17 is lowered below the water level 20, the oil slick and minimal adjacent water is skimmed off continuously into the lower isolated hull compartment 22. As noted from the drawings, this compartment may take up the entire lower portion of the boat. The amount of water and oil skimmed from the body of water is controlled by the operator, who adjusts the front panel position and the boat speed, taking into consideration the condition of the sea.

At the rear of boat 10 within the hull 26 are mounted one or more jet pumps 30. As shown, two pumps of a type equivalent to a Jacuzzi Marine Jet Propulsion Pump, series 12WJ, each handling up to 36 gallons per second or more at 2,000 RPM, may be used. Any other pumping arrangement to accomplish the handling of a large quantity of water may be used, such as electric pumps or their equivalent used singly or in multiple combination, depending on the volume of oil and water handled and the size of the boat. When the water-oil mixture scooped into the lower compartment 22 reaches a given volume as indicated by a float-type gauge on the console 15, the operator starts one or more of the jet pumps, causing liquid in a surging fashion to be pumped out of the lower hull of the boat through pipe 31, hose 29 and into the towed boat or barge.

Figure 4:
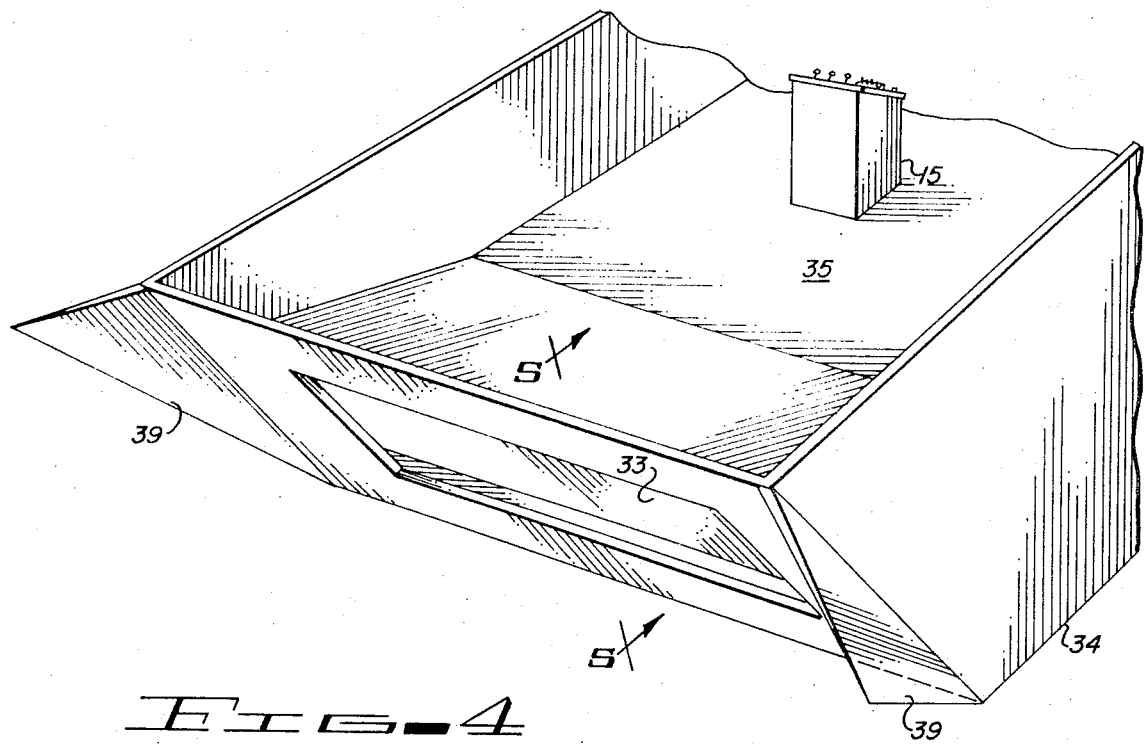
FIG. 4 is a partial perspective front end view of an alternate bow configuration for the boat shown in FIG. 1 employing a sliding front panel and solidly mounted gathering fins.

FIGS. 4 and 5 illustrate an alternate front panel skimming arrangement wherein a front panel 33 slides up and down the inside surface of the bow of a hull 34 of a barge or boat 35, where it is mounted in water sealed channels 36 similar to those used in sluice gates for a dam in irrigation control. This panel may be moved from a top closed position to an open position, allowing the same amount of water flow adjustment as the hinged panel described above for FIGS. 1–3. The control for the sliding panel consists of a worm gear 37 mounted in fixed bearings above and below the panel on hull 34 and is driven by an electric motor 38 which rotates the worm driving the panel. The operator, who has an indicator on his console 15 of the position of panel 33, can vary the panel's position at will. In this arrangement, the two side-mounted vertical gathering and stabilizing fine 39 are solidly fixed to the hull of the boat, but in the event it is necessary for portability, they could be removed.

The towed boat or barge 11 as shown in FIGS. 6 and 7 is much larger than boat 10 in order to provide enough storage capacity to handle the continuous flow required for efficient oil slick removal.

To give some measure of the feasibility of the basic idea of scooping up an oil slick from the surface of a body of water, the following table is provided to show the amount of flow to be handled for various skim depths and boat speeds for a 7½ to 8-feet wide water opening. This would be the maximum opening used when highway portability of the boat is desired; otherwise much greater widths could be used to advantage.

| BOAT SPEED MPH | SKIM DEPTH INCHES | FLOW INTO LEAD BOAT GAL/SEC |
| --- | --- | --- |
| 1 | 1 | 6.8 |
|   | 2 | 13.6 |
|   | 3 | 20.4 |
| 2 | 1 | 13.6 |
|   | 2 | 27.2 |
|   | 3 | 40.8 |
| 3 | 1 | 20.4 |
|   | 2 | 40.8 |
|   | 3 | 61.2 |
| 4 | 1 | 27.2 |
|   | 2 | 54.4 |
|   | 3 | 81.6 |
| 5 | 1 | 34.0 |
|   | 2 | 68.0 |
|   | 3 | 102.0 |

The towed barge 11 comprises a lower compartment 40 which is covered by a middle deck 41. Deck 41 supports several compartments 42 which are isolated from each other by partitions 42'. Compartments 42 are covered by a top deck 43, where the barge attendant may be located. The top deck may provide, where required, suitable openings to view the contents and the condition of the several upper compartments 42.

The jet-pumped oil-water mixture from boat 10 enters the towed barge 11 through a flexible hose 29, pipe connector 44, and suitable piping 45 to the stern of the barge. As it exhausts from outlet 46 of piping 45, the lower compartment is filled to the air space 47 maintained to control the oil-water level in the barge.

As the mixture of oil and water enters the lower compartment 40 of barge 11 from pipe outlet 46 and moves into chamber 40, the oil rises to the surface of the liquid within seconds where it accumulates in a heavy layer just below the air space 47 and above the water. This continuously accumulating oil is pumped off the top surface of the water in chamber 40 through an intake pipe 48 by a pump $P_1$. This oil is pumped upward into one of the storage compartments 42. The operator selects the compartment to be filled by opening one of the control valves 49 and then closing the others. As a compartment is filled with oil the operator opens the valve to another empty compartment and closes the valve to the filled compartment. This procedure is repeated again and again. When a compartment is filled with oil, it can then be emptied into a tanker or its equivalent parked alongside, by opening an exhaust valve 50 of that compartment and starting a pump 51 to move the oil through a flexible hose 52 into the tanker for reclaiming.

As oil is being separated from the water-oil mixture in chamber 40 and being pumped into compartments 42, a suitable pump $P_2$ is utilized to pump water from the base of chamber 40 through piping 53 and 54 into a water filter 55, where it is purified before being pumped through conduit 56 back into the sea, lake, river or other retainer. In this manner, a continuous gathering, storage and removal process can be carried on, separating the polluting oil slick from the sea before it can do much harm, thus minimizing the effects of an oil spill at sea.

Other variations of the hull could be used to gather various harbor pollutants and debris.

It should be recognized that the buoyancy of the boat and barges disclosed depend on their ability to displace a greater weight of water than the weight of the materials of which it is built and the weight of the water and oil stored in it. Thus, these conditions must be recognized in designing the capacity of the various liquid storage compartments.

It should also be recognized that boat 10 may be used as a sump for draining an oil slick into its interior where the oil may be immediately pumped into an associated container such as barge 11. Thus, the boat may be moved at will into an oil slick and then by gravity collect the surface water and oil. The boat may be moved slowly through the slick gathering the surface water into its hull. Further, it is intended to fall within this disclosure to provide a single boat which may be capable of providing the slick gather and oil water separating process all in one hull.

Although but two embodiments of the present invention have been illustrated and described, it will be apparent to those skilled in the art that various changes and modifications may be made without departing from the spirit of the invention or from the scope of the appended claims.

What is claimed is:

1. A flat-bottomed barge having a bow and stern for removing oil slicks from a body of water comprising:
   a first compartment extending the length and width of the barge,
   a second compartment extending from and below said first compartment and forming a liquid receiving compartment therebetween,
   said second compartment extending the length and width of the barge and isolated from said first compartment,
   a sluice gate formed in said second compartment in the bow of the barge for selectively admitting surface water only into the receiving compartment,
   means mounted on said barge for controlling the opening and closing of said sluice gate to vary the depth of surface water admitted into said receiving compartment, and
   jet means for pumping out of said receiving compartment the water and oil mixture skimmed from said body of water,
   each of said first and second compartments having a blunt bow,
   said sluice gate comprising a panel hingedly mounted on the bottom of said second compartment for movement angularly thereto to selectively move from a closed gate position wherein the top of said panel is above the surface of the water to a position wherein the top of the gate is below the surface of the water, and a a pair of flaps, one mounted on said barge at each side of said panel for forming a closed funnel with said panel extending into said receiving compartment, and means for keeping said flaps in contact with the edges of said panel when said panel is moved to any of its various angular positions, means connected to said pumping means for directing the skimmed water and oil into a container, said container comprising a storage compartment, and means for separating the oil from said stored skimmed water and returning the water to said body of water.

2. The barge set forth in claim 1 wherein:

said sluice gate comprises a panel slidably mounted on the inside surface of the bow of said second compartment, and said means for controlling the opening and closing of said sluice gate comprises a worm gear.

3. The apparatus set forth in claim 1 wherein: said container comprises a second barge.

* * * * *